United States Patent
Oguma et al.

(10) Patent No.: US 9,367,274 B2
(45) Date of Patent: Jun. 14, 2016

(54) NETWORK-BASED EVENT NOTIFICATION SYSTEM

(71) Applicant: KYOCERA DOCUMENT SOLUTIONS INC., Osaka-shi (JP)

(72) Inventors: Takashi Oguma, Osaka (JP); Takehiko Asano, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/375,031

(22) PCT Filed: Jan. 29, 2013

(86) PCT No.: PCT/JP2013/051920
§ 371 (c)(1),
(2) Date: Jul. 28, 2014

(87) PCT Pub. No.: WO2013/115188
PCT Pub. Date: Aug. 8, 2013

(65) Prior Publication Data
US 2015/0043031 A1   Feb. 12, 2015

(30) Foreign Application Priority Data
Jan. 30, 2012  (JP) ................. 2012-016358

(51) Int. Cl.
*G06F 3/12* (2006.01)
*G06F 11/30* (2006.01)
(Continued)

(52) U.S. Cl.
CPC ............. *G06F 3/1285* (2013.01); *G06F 3/121* (2013.01); *G06F 3/1207* (2013.01);
(Continued)

(58) Field of Classification Search
CPC .................................. G06F 9/44; H04N 1/00
USPC ....................................................... 358/1.13
See application file for complete search history.

(56) References Cited

U.S. PATENT DOCUMENTS

| 8,146,105 B2 | 3/2012 | Nakamura |
| 2002/0101604 A1* | 8/2002 | Mima et al. .................. 358/1.15 |

(Continued)

FOREIGN PATENT DOCUMENTS

| CN | 101207678 A | 6/2008 |
| EP | 1895401 A1 | 3/2008 |

(Continued)

OTHER PUBLICATIONS

Search Report issued Sep. 22, 2015 in corresponding european patent application No. 13743696.0.

*Primary Examiner* — Marivelisse Santiago Cordero
*Assistant Examiner* — Daryl Jackson
(74) *Attorney, Agent, or Firm* — Knobbe Martens Olson & Bear LLP (57) ABSTRACT

Upon startup of an OS, the present invention obtains an entry of a StatusMonitor key from all printer driver setting information subscribed in a registry by means of a subscriber (S0), and if a value thereof is 1, obtains an entry of a key including "Notification". If a value of an array element 0 indicates activation of notification, the present invention obtains a character string of an array element 1 as an event type, and makes a Subscribe request to an image forming apparatus (S3). The present invention stores a subscription ID being returned, and makes an Unsubscribe request to the image forming apparatus for all subscription IDs thus stored, upon shut-down of the OS.

5 Claims, 7 Drawing Sheets (51) Int. Cl.
*H04N 1/00* (2006.01)
*G06F 9/44* (2006.01)
*G06F 11/32* (2006.01)

(52) U.S. Cl.
CPC ........... *G06F 3/1229* (2013.01); *G06F 3/1259* (2013.01); *G06F 11/3013* (2013.01); *G06F 11/3055* (2013.01); *G06F 11/3065* (2013.01); *G06F 11/324* (2013.01); *G06F 2201/86* (2013.01)

(56) References Cited

U.S. PATENT DOCUMENTS

2004/0064759 A1* 4/2004 McGuire et al. ................ 714/39
2004/0153998 A1* 8/2004 McGuire et al. ............... 717/128
2007/0143473 A1* 6/2007 Wada ............................ 709/224
2008/0155563 A1* 6/2008 Nakamura .................... 719/318
2008/0158596 A1 7/2008 Kadota
2008/0209419 A1* 8/2008 Maeda .......................... 718/100
2012/0019873 A1* 1/2012 Tian ............................. 358/442

FOREIGN PATENT DOCUMENTS

| JP | 2004-185217 A | 7/2004 |
| JP | 2008-158629 A | 7/2008 |
| JP | 2008-165510 A | 7/2008 |
| JP | 2009-009220 A | 1/2009 |
| JP | 2009-230477 A | 10/2009 |

\* cited by examiner

REGISTRY 64

| NAME | TYPE | DATA |
|---|---|---|
| StatusMonitor | REG_DWORD | 0x00000000 |
| IPAddress | REG_SZ | 192.168.2.1 |
| Notification1 | REG_MULTI_SZ | JobStatus 1 |
| Notification2 | REG_MULTI_SZ | PrinterStatus 0 |

FIG. 5A

EVENT TYPE 81

| CODE | NAME |
|---|---|
| 01 | JobStatusEvent |
| 02 | PrinterStatusEvent |
| ⋮ | ⋮ |

FIG. 5B

EVENT 82

| CODE | NAME |
|---|---|
| 0100 | Start |
| 0101 | Stop |
| 0102 | Pause |
| 0103 | Resume |
| 0104 | Completed |
| 0200 | Ready |
| 0201 | Printing |
| 0202 | Out of Toner |
| ⋮ | ⋮ |

FIG. 5C

Subscriptions 83

| SubscripionID | EVENT TYPE CODE | IP ADDRESS | TIME STAMP | ACTIVATION |
|---|---|---|---|---|
| 1 | 01 | 192.168.2.12 | 20120116:091228 | 1 |
| 2 | 01 | 192.168.2.15 | 20120118:103651 | 1 |
| 3 | 02 | 192.168.2.12 | 20120117:134709 | 1 |
| ⋮ | ⋮ | ⋮ | ⋮ | ⋮ |

NETWORK-BASED EVENT NOTIFICATION SYSTEM

CROSS-REFERENCE TO RELATED APPLICATIONS

This application is the U.S. National Phase under 35. U.S.C. §371 of International Application PCT/JP2013/051920, filed Jan. 29, 2013, which claims priority to Japanese Patent Application No. 2012-016358, filed Jan. 30, 2012. The disclosures of the above-described applications are hereby incorporated by reference in their entirety. The International Application was published under PCT Article 21(2) in a language other than English.

TECHNICAL FIELD

The present invention relates to a network-based event notification system in which a host and a plurality of devices are connected via the network, and more specifically to an event notification system in a network that notifies the host of an event that occurs in the device, according to a request from the host to the device, based on a type of the event subscribed and a notification destination address.

BACKGROUND ART

A specification for notifying a host of an event that occurs in a network device such as an image forming apparatus via a network is prescribed as WS-Evanting. According to this, it is sufficient to notify only a host that has made a subscription request of an event of a type (Filter element) relating to the request, and there is no need for going through a dedicated management device for notification of an event.

Conventionally, after start-up of a printer driver, the printer driver was making the subscription request (FIG. 16 of Patent Document 1).

Patent Document 1: Japanese Unexamined Patent Application Publication No. 2009-230477

DISCLOSURE OF THE INVENTION

Problems to be Solved by the Invention

However, since an image forming apparatus is required to process a notification reservation subscription request for each of a plurality of devices and notify each event that occurs based on the subscription, load may be concentrated. As a result, if the printer driver makes the subscription request before starting printing and submits printing data to the image forming apparatus after receiving an acknowledge response thereto, completion of a printing job may be delayed.

Given this, it is configured in such a way that submission of the printing data and start-up of a status monitor take place simultaneously, and the status monitor performs the subscription request.

Nevertheless, in a case in which the printing data is small or an error occurs in the image forming apparatus immediately after a printing start instruction, a printing process may be completed before completion of start-up of the status monitor or an error may occur, preventing reception of an event notification of completion of printing or occurrence of an error. Such a problem applies similarly to other network devices.

The objective of the present invention is to provide an event notification system in a network that allows notification of an event, which occurs in a device immediately after making a processing request to the device, to a host.

Means for Solving the Problems

The present invention is an event notification system wherein: a plurality of devices and a host, in which device drivers relating to the plurality of devices are installed in a storage unit, are connected via a network; and the event notification system notifies the host of an occurrence of an event based on a request from the host to the device, according to a type of the event and a notification destination address that are subscribed in the device. A status monitor and a database, in which on/off information of the status monitor for each of the plurality of device drivers is subscribed, are further stored in the storage unit. The status monitor is provided with a resident program and an UI program. The resident program makes a processor of the host, upon start-up of an operating system, for each of the plurality of device drivers, make a subscription request of an event notification to the device corresponding to the device driver for which the on/off information of the status monitor indicates on, and receive the event notification from the device. The UI program makes the processor display a content of the event notification.

BRIEF DESCRIPTION OF THE DRAWINGS

FIG. 1 is a schematic block diagram illustrating an event notification system in a network according to Embodiment 1 of the present invention;

FIG. 4 is an explanatory diagram illustrating a part of setting data of a printer driver subscribed in a registry;

FIG. 5C is a diagram illustrating a configuration example of a subscriptions table included in the event database of FIG. 3;

FIG. 6A is a flow chart illustrating a subscription request process of an event notification by the subscriber in FIG. 3;

EXPLANATION OF REFERENCE NUMERALS

10-1N PC
20-22 Image forming apparatus
30 Network
41, 51 CPU
42, 52 Interface
43, 53 PROM
44, 54 DRAM
45, 55 Auxiliary storage device
46, 56 Network interface
47 Conversational input/output device
57 Operation panel 58 Scanner
59 Printer
5A Fax modem
60A-60C Printer driver
61 Document creating application
62 GDI
63, 70 Communication unit
64 Registry
65 Event notification setting unit
66 Subscriber
67 Status monitor
670 Event sync
671 UI unit
68 Event log unit
69, 72 SOAP processing unit
71 Image forming apparatus main body part
73 Event source
730 Subscription manager
731 Notification manager
80 Event database
81 Event type table
82 Event table
83 Subscriptions table

PREFERRED MODE FOR CARRYING OUT THE INVENTION

FIG. 1 is a schematic block diagram illustrating an event notification system in a network according to Embodiment 1 of the present invention.

In this system, (N+1) PCs (personal computers) 10-1N as the hosts and image forming apparatuses 20-22 as the devices used therein are connected via a network 30.

Figure 2:
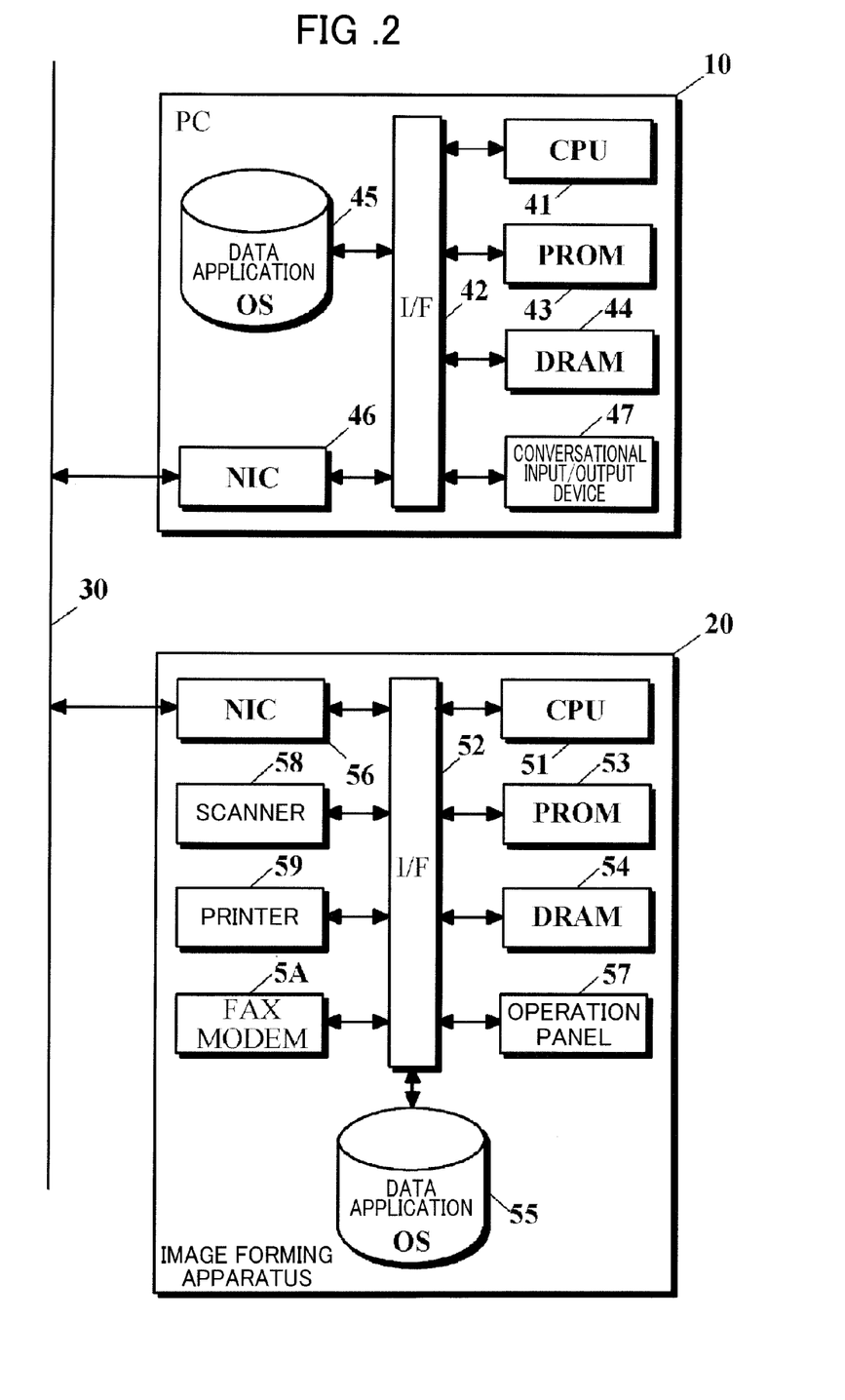
FIG. 2 is a schematic block diagram illustrating a hardware configuration of a PC and an image forming apparatus, representing the system of FIG. 1.

FIG. 2 is a schematic block diagram illustrating a hardware configuration of a PC 10 and an image forming apparatus 20, representing the system of FIG. 1.

In the PC 10, a CPU 41 is connected to PROM 43, DRAM 44, an auxiliary storage device 45, a network interface 46, and a conversational input/output device 47 via an interface 42. In FIG. 2, interfaces 42 of multiple types are represented by a block for the sake of simplicity.

The PROM 43 is, for example, a flash memory. A BIOS (Basic Input/Output System) is stored in the PROM 43. The DRAM 44 is used as a main storage device. An OS (Operating System), various drivers, applications, and data are stored in the auxiliary storage device 45. The drivers and applications include those described later in the PC 10 illustrated in FIG. 3. The network interface 46 is connected to the network 30. The conversational input/output device 47 is provided with, for example, a keyboard and a pointing device as input devices, and a display device.

In the image forming apparatus 20, a CPU 21 is connected to PROM 53, DRAM 54, an auxiliary storage device 55, a network interface 56, an operation panel 57, a scanner 58, a printer 59, and a fax modem 5A via an interface 52. In FIG. 2, interfaces 52 of multiple types are represented by a block for the sake of simplicity.

A BIOS, an OS, various drivers, and various applications for a function as the image forming apparatus are stored in the PROM 53. The applications include those described later in the image forming apparatus 20 illustrated in FIG. 3. The DRAM 54 is used as a main storage device. Printing data, image data scanned by the scanner 58, an auxiliary file (described later), and facsimile reception data are stored in the auxiliary storage device 55. The network interface 56 is connected to the network 30. The operation panel 57 is provided with an input unit and a display unit. The scanner 58 is used for generating an image file. The file is used for printing, facsimile submission, and submission of a file. The printer 59 is provided with a printing engine, a paper feeding unit, a conveyance unit, and a paper discharge unit.

Other PCs and image forming apparatuses in FIG. 1 have the same configuration as that described above.

Figure 3:
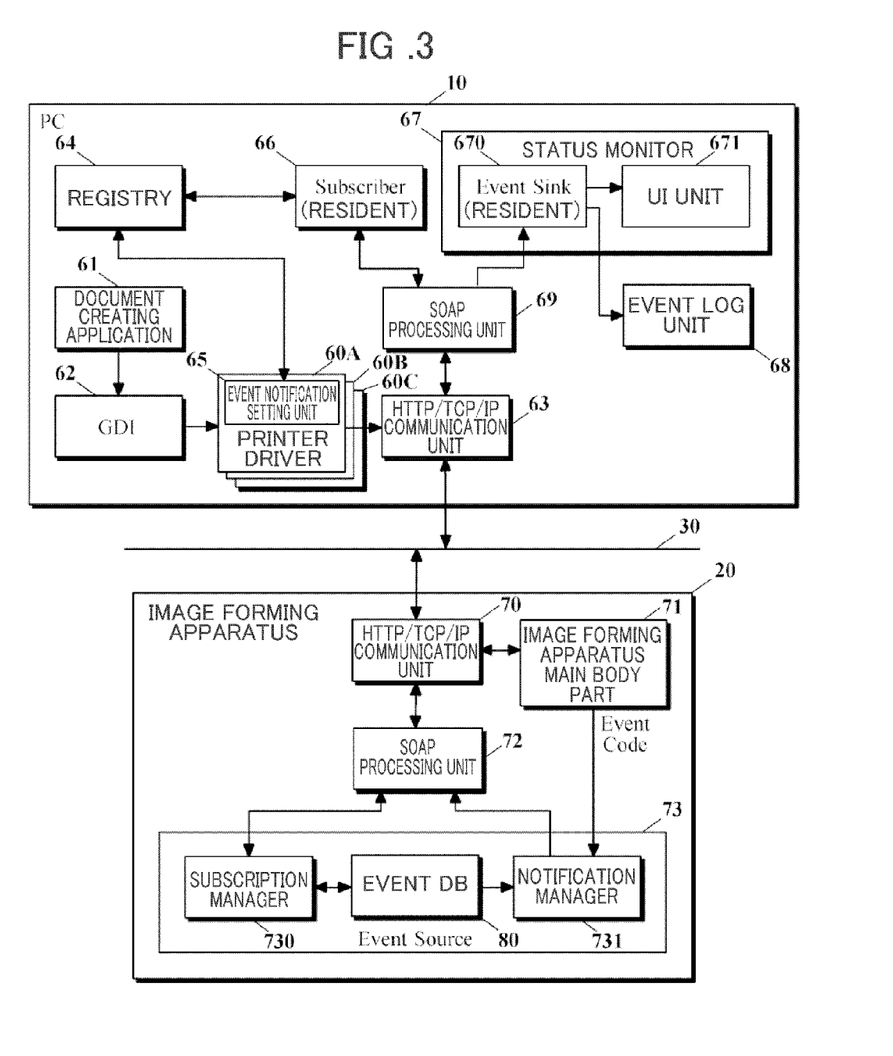
FIG. 3 is a schematic functional block diagram illustrating a PC and an image forming apparatus, representing the system of FIG. 1.

FIG. 3 is a schematic functional block diagram illustrating the PC 10 and the image forming apparatus 20, representing the system of FIG. 1.

Printer drivers 60A, 60B, and 60C installed in the PC 10 correspond respectively to image forming apparatuses 20, 21, and 22 illustrated in FIG. 1. A document is created by a document creating application 61, printing parameters such as paper size, number of copies, post processing, and the like are set through a dialog box, and then printing start instruction is made. And then, the printing data is supplied to a selected printer driver 60A through a GDI (Graphics Device Interface) 62 of the OS. Furthermore, the printing data is converted into PDL (Page Description Language) data that can be interpreted by the image forming device 20, and is transmitted to the image forming device 20 through a communication unit 63 and a network 30.

Setting information of the OS, the device drivers, and the applications is subscribed in the registry 64 as the database in a tree format. The registry 64 is configured such that a value and a data type for an entry (key) are readable/writable by specifying a path in the tree.

FIG. 4 shows a part of setting data under a printer driver node under a printer node that belongs to a path "HKEY_LOCAL_MACHINE¥SYSTEM¥CurrentControlSet¥Control¥Print¥Printers" of the Printers key in the subscribed data for the printer driver 60A subscribed in the registry 64. In FIG. 4, NAME, TYPE, and DATA are names, data types, and values of respective entries.

For example, StatusMonitor key shows that the data type is a numerical value (REG_DWORD) and the value is 0 (0x00000000). In other words, StatusMonitor key indicates that the status monitor for displaying an event occurring in the image forming apparatus 20 on the PC 10 is set to off. IPAddress key shows that the data type is a character string (REG_SG) and the value is "192.168.2.1", indicating that an IP address of the image forming apparatus 20 is 192.168.2.1. Notification key shows that the data type is an array of character strings (REG_MULTI_SG) and the value is {"JobStatus", "1"}, indicating that a type of an event notification from the image forming apparatus 20 to the PC 10 is "JobStatus" and notification is activated. Similarly, Notification2 key shows that the data type is an array of character strings and the value is {"PrinterStatus", "0"}, indicating that a type of an event notification from the image forming apparatus 20 to the PC 10 is "PrinterStatus" and notification is inactivated.

The printer driver 60A includes an event notification setting unit 65. This allows setting of on/off of the status monitor and activation/inactivation of the notification for each event type, upon setting of the printing parameters. The same applies to the printer drivers 60B and 60C.

Subscription of an event from the PC 10 to each of the image forming apparatuses 20 to 22, as well as notification of the event therefrom to the PC 10 are performed in conformity to the WS-Eventing specification. In other words, an event that occurs in the image forming apparatus 20 is notified to the status monitor 67 and displayed, according to the event type and the notification destination address that are subscribed to the image forming apparatus 20 based on the subscription request of event notification (Subscribe request) from the subscriber 66 to the image forming apparatus 20.

The status monitor 67 is provided with an event sync 670 and an UI unit 671. The event sync 670 subscribes a notified event with an event log unit 68 and notifies the UI unit 671 of the event. In response to this, the UI unit 671 displays a content of the notification in a pop-up dialog box. The log can be viewed from an event viewer of the OS.

The subscriber 66 and the event sync 670 are resident programs, and, in a case in which the OS is Windows (registered trademark), these are Windows service applications. It should be noted that, the notification from the event sync 670 to the UI unit 671 can be in such a mode that the UI unit 671 is indirectly called by an event occurring as a result of subscription of an event from the event sync 670 to the event log unit 68.

The subscriber 66 and the event sync 670 are started by the OS upon start-up of the OS, and terminated upon shutdown of the OS.

The subscriber 66 calls a Web service method with respect to a SOAP proxy in a SOAP processing unit 69. And then, the content thereof is XML serialized by the proxy and converted into a SOAP message, and submitted to the image forming apparatus 20 via an HTTP/TCP/IP protocol stack in the communication unit 63. The event notification message from the image forming apparatus 20 is XML deserialized by a SOAP listener in the SOAP processing unit 69 via the network 30 and the communication unit 63, and then transmitted as an event notification object to the event sync 670.

In the image forming apparatus 20, the printing data is supplied to an image forming apparatus main body part 71 via the network 30 and a TCP/IP protocol stack in the communication unit 70. The data is developed to bitmap data and a photosensitive drum is exposed by raster data thereof, thereby forming an electrostatic latent image. The image is developed by a toner, transferred to and fused onto paper. The paper is then discharged.

On the other hand, the SOAP message of the subscription request of an event notification from the PC 10 is supplied to a SOAP processing unit 72 via the network 30 and the HTTP/TCP/IP protocol stack in the communication unit 70, and then XML deserialized. The SOAP message is supplied, as a subscription request object of the event notification, to a subscription manager 730 of an event source 73. In response to this, the subscription manager 730 subscribes event notification information with an event database 80 as described later.

Figure 5A:
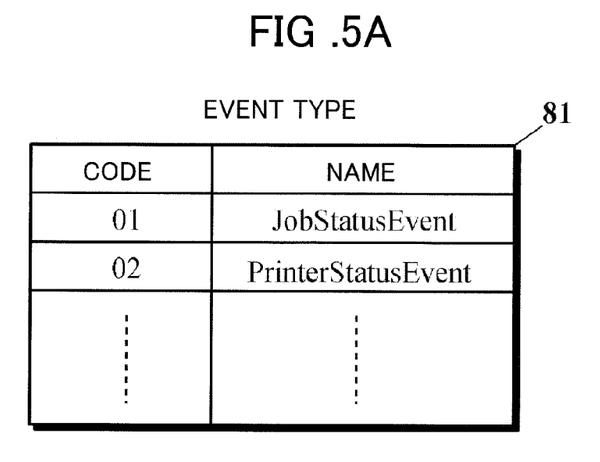
FIG. 5A is a diagram illustrating a configuration example of an event type table included in the event database of FIG. 3.
Figure 5B:
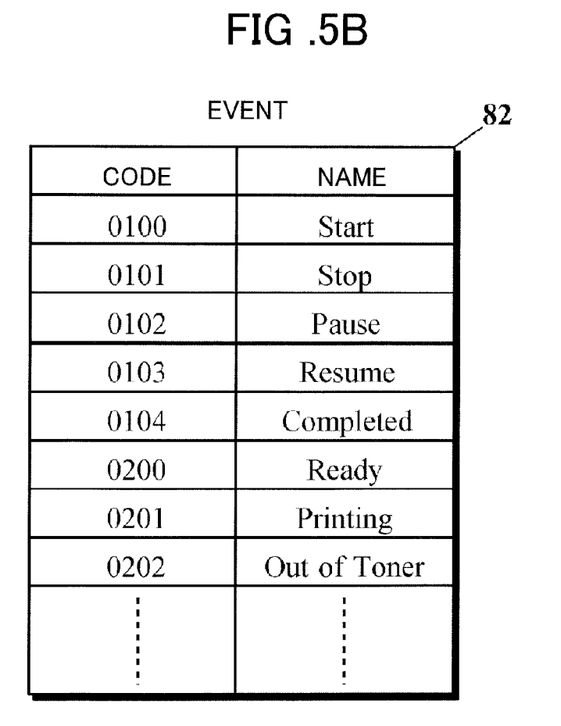
FIG. 5B is a diagram illustrating a configuration example of an event table included in the event database of FIG. 3.

FIGS. 5A to 5C illustrate respective configuration examples of an event type table 81, an event table 82, and a subscriptions table 83 included in the event database 80. In the event type table 81, names of event types that can be notified and codes are subscribed in pairs. In the event table 82, names of events and codes are subscribed in pairs. In this example, the event code is in four digits. The first two digits thereof represent an event type code and the last two digits represent an event sub-code. More specifically, the event codes 0100 to 0104 indicate that the event type is JobStatusEvent. The event codes 0200 to 0202 indicate that the event type is PrinterStatusEvent.

The SOAP message of the subscription request of the event notification includes: a ReplyTo address (address of the subscriber 66) including an IP address of a request source; a NotifyTo address (address of the event sync 670) including the IP address of the request source; a To address (address of the subscription manager 730) including an IP address of a request destination; and an event type as a Filter element. Default port numbers and paths are used as port numbers and paths in the PC 10 and the image forming apparatus 20 at these addresses. It should be noted that addresses listed in a configuration file (not illustrated) can also be used as these addresses.

The subscription manager 730 creates Subscription (line) based on the content of the SOAP message as described later, and subscribes with the subscriptions table 83 as shown in FIG. 5C.

When an event occurs in the image forming apparatus main body part 71, a code thereof is supplied to a notification manager 731 of the event source 73. In response to this, the notification manager 731 performs the following process each time a line having the event type code corresponding to the first two digits of the code is read from the subscriptions table 83.

(1) In a case in which an activation flag is "1" and a difference between the current time and date and a timestamp included in this line is smaller than a valid period, the notification manager 731 supplies information for notifying the event sync 670 in a host having the IP address included in this line of occurrence of an event corresponding to the code, to the SOAP processing unit 72.

(2) In a case in which the activation flag is "1" and the difference between the current time and date and the timestamp included in this line is equal to or greater than the valid period, the activation flag is changed to "0" via the subscription manager 730 and the notification manager 731 supplies information for notifying the subscriber 66 in a host having the IP address included in this line of the expiration of the valid period, to the SOAP processing unit 72.

(3) In a case in which the activation flag is "0", the notification manager 731 terminates this processing for subscription.

After the above process (1), the SOAP processing unit 72 converts (serializes) the information into an XML SOAP message, and then submits to the PC 10 via the communication unit 70 and the network 30. The information includes a name of an event type corresponding to the event code; a name of an event corresponding to the event code; and time and date of occurrence.

The message is converted into an object by the SOAP processing unit 69, transmitted to the event sync 670, and subscribed with the event log unit 68. The UI unit 671 displays the content thereof in a pop-up dialog box.

Figure 6B:
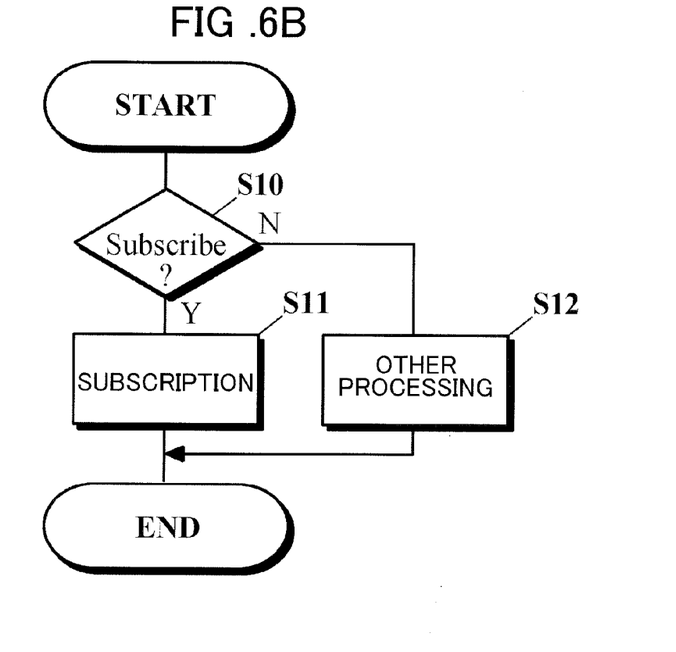
FIG. 6B is a flow chart illustrating a subscription request process of an event notification by the subscriber in FIG. 3.

FIGS. 6A and 6B are flow charts illustrating a subscription request (Subscribe) process of an event notification by the subscriber 66. The process is called and executed by the OS upon startup of the OS. The process of Steps S0 to S3 is a loop process performed for each of all printer drivers. Hereafter, symbols between parentheses are step identification symbols in the drawings.

(S0) From all the printer driver setting information subscribed in the registry 64, for example keys in a key group relating to a driver of each printer under the path of the Printers key described above are scanned to obtain an entry of the StatusMonitor key. It should be noted that, if a relative path from the printer driver key is known, a path of the StatusMonitor key can be directly specified each time the printer driver key is found, to obtain the entry thereof.

(S1) In a case there is any hit, the processing advances to Step S2; on the other hand, if there is no hit, in other words all printer drivers have been processed, the processing illustrated in FIG. 6A terminates.

(S2) If the value of the StatusMonitor key is 1, the processing advances to Step S3; on the other hand, if the value of the StatusMonitor key is 0, the processing returns to Step S0.

(S3) Among the key group under the printer driver key to which the StatusMonitor key belongs, an entry for a key including "Notification" is obtained. If the value for activation/inactivation of the notification indicates activation, in other words the value for an element with an index 1 in the array is 1, a character string of an element with an index 0 is obtained as the event type. A SOAP message of the Subscribe request including said type as a value for the Filter element is submitted to the subscription manager 730.

The SOAP message includes an address of the subscriber 66 including an IP address of the PC 10 as a ReplyTo address, and an address of the event sync 670 including said IP address as a NotifyTo address. The SOAP message further includes an address of the subscription manager 730 of the image forming apparatus 20, including a value for the IPAddress key included in the key group as a subscription request destination IP address of the event notification, as a To address.

The processing of Step S3 is performed for each key including "Notification". The processing then returns to Step S0.

FIG. 6B is a schematic flow chart illustrating processing by the subscription manager 730 with response to the Subscribe request.

(S10) If the Subscribe request is a subscription request of the event notification, the processing advances to Step S11; and if not, the processing advances to Step S12.

(S11) As described above, the subscription manager 730 refers to the event type table 81, converts the event type included in the request message to a code, generates a subscription ID, obtains current time and date as a time stamp, and sets the activation flag as "1". In addition, the subscription manager 730 subscribes a line including these values with the subscriptions table 83, replies to the subscriber 66 with a response message including this subscription ID, and terminates the processing illustrated in FIG. 6B.

The subscriber 66 stores this subscription ID for use in the processing illustrated in FIG. 7, described later, and the like.

(S12) Other processing is performed according to the request, and the processing illustrated in FIG. 6B is terminated.

Figure 7:
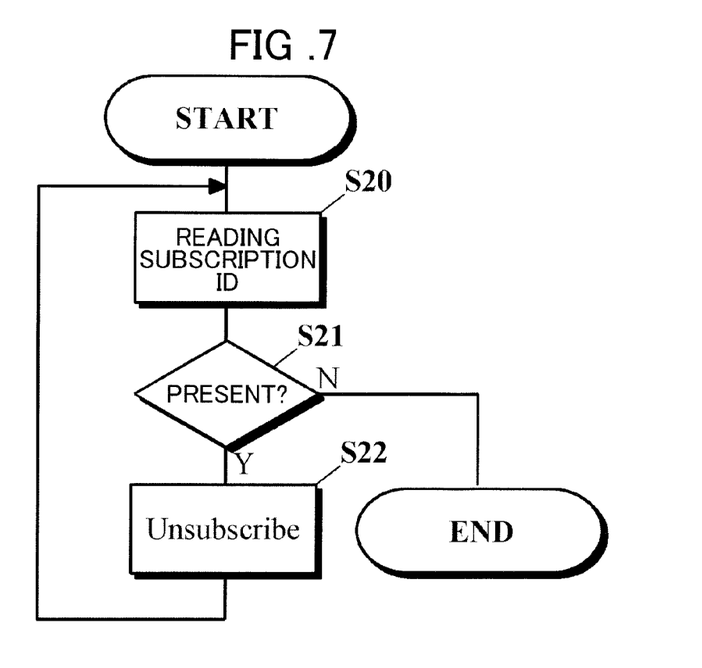
FIG. 7 is a flow chart illustrating an unsubscription process request of an event notification by the subscriber in FIG. 3.

FIG. 7 is a schematic flow chart illustrating an unsubscription process request of the event notification by the subscriber 66. The process is called and executed by the OS upon shutdown of the OS. The processing of Steps S20 to S22 is loop processing performed for each of all subscriptions stored as described above.

(S20) One of all subscription IDs stored as described above is read.

(S21) If there is nothing to read, the processing illustrated in FIG. 9 is terminated; if not, the processing advances to Step S22.

(S22) A SOAP message of the unsubscribe request of the event notification (Unsubscribe request) including this subscription ID is submitted to the subscription manager 730, the subscription ID is deleted from the subscriber 66, and the processing returns to Step S20.

The subscription manager 730, in response to this request, deletes the subscription from the subscriptions table 83.

It should be noted that, when the notification of the above (2) is transmitted to the subscriber 66, the subscriber 66 pops up the content of the notification via the UI unit 671. A user can set the activation flag to "1" and update the time stamp to the current time, by making a Renew request to the subscription manager 730 through the event notification setting unit 65 and the subscriber 66.

Other PCs and image forming apparatuses in FIG. 1 are similar to that described above.

Embodiment 1 provides an effect of automatically making a subscription of an event notification desired by the user with respect to the image forming apparatus, by starting up the subscriber 66 upon start-up of the OS to refer to the registry 64. In addition, Embodiment 1 provides an effect of allowing notification of an event, which occurs in the image forming apparatus immediately after making the processing request to the image forming apparatus, to the PC.

In addition, upon shutdown of the OS, the subscriber 66 makes the unsubscription request of the event notification with respect to the image forming apparatus to which the notification subscribe request has been made. As a result, Embodiment 1 provides an effect of alleviating a load of the subscription manager 730 while maintaining the above mentioned effect.

In Embodiment 2, upon transition of the PC 10 to a power saving mode, for example a stand-by mode or a sleep mode, the PC 10 performs the processing illustrated in FIG. 7 in response to occurrence of the transition event. Upon return from the power saving mode, the PC 10 and the image forming apparatus 20 perform the processing illustrated in FIGS. 6A and 6B, respectively, in response to occurrence of the return event.

This configuration provides an effect of further alleviating the load of the subscription manager 730 while maintaining effects of Embodiment 1.

Preferred embodiments of the present invention have been described above; however, the present invention additionally includes various modifications. For example, the present invention includes other combinations of constituent features described above in the plurality of embodiments; matters employing other configurations realizing the functions of the constituent features; and other configurations that would be conceived by those skilled in the art from these configurations or features.

For example, the database used in Step S20 is not limited to the registry 64 and can be other type of database.

In addition, the event sync 670 can also be configured to start up upon start-up of the printer driver and shut down upon shutdown on the printer driver. In addition, a configuration in which the subscriber 66 and the event sync 670 constitute a single resident application and the resident application is started up upon start-up of the OS is accepted.

Furthermore, the network device is not limited to a multi-function peripheral, and can also be a printer, a scanner, a facsimile machine, or other devices.

What is claimed is:
1. A network-based event notification system comprising:
a plurality of image forming apparatuses connected to a network; and
a host, which includes a plurality of printer drivers corresponding to the plurality of image forming apparatuses connected to the network, the plurality of printer drivers being installed in a storage unit included in the host;
wherein the event notification system notifies the host of an event based on a request from the host to an image forming apparatus, according to a type of the event and a notification destination address that are subscribed in the image forming apparatus,
wherein the storage unit included in the host comprises:
a status monitor; and
a registry serving as a database, in which setting information of each of the printer drivers is subscribed in a tree format and a value and a data type for a key are set by specifying a path in the tree format,
wherein the registry includes:
a status monitor key including on/off information of the status monitor for each of the plurality of printer drivers;

an IP address key including an IP address of the image forming apparatus; and a notification key including activation/inactivation information of notification for the type of the event, wherein the value and the data type for the key are set via each of the printer drivers, upon setting printing parameters, and wherein the status monitor:

i) obtains the value and the data type for the key for each of the plurality of printer drivers, upon a start-up of an operating system;

ii) makes a subscription of the request notifying the host of the event to the image forming apparatus having the IP address included in the IP address key, the image forming apparatus being corresponding to the printer driver for which the on/off information of the status monitor included in the status monitor key indicates "on" and the activation/inactivation information of notification for the type of the event included in the notification key indicates "activation";

iii) receives the notification of the event from the image forming apparatus; and iv) displays a content of the notification of the event.

2. The event notification system according to claim 1, wherein the status monitor makes an unsubscription of the request notifying the host of the event to each of the image forming apparatuses for which the notification of the event is subscribed, upon a shut-down of the operating system.

3. The event notification system according to claim 1, wherein the status monitor makes an unsubscription of the request notifying the host of the event to each of the image forming apparatuses for which the notification of the event is subscribed, upon transition of the host to a power saving mode, and, the status monitor makes the subscription of the request notifying the host of the event to the image forming apparatus to which the unsubscription request has been made, upon return from the power saving mode.

4. The event notification system according to claim 1, wherein the image forming apparatus comprises at least one of a printer, a scanner, a facsimile device, and a multi-function peripheral.

5. The event notification system according to claim 1, wherein the status monitor makes the subscription of the request notifying the host of the event to the image forming apparatus and receives the notification of the event from the image forming apparatus according to a WS-Eventing specification.

* * * * *